United States Patent Office 3,779,988
Patented Dec. 18, 1973

3,779,988
POLYEPOXIDE-POLYSILOXANE COMPOUNDS, PROCESSES FOR THEIR MANUFACTURE AND THEIR USE
Heinz Rembold, Arlesheim, Dieter Baumann, Birsfelden, and Jurgen Habermeier, Pfeffingen, Switzerland, assignors to Ciba-Geigy Corporation, Ardsley, N.Y.
No Drawing. Filed Sept. 8, 1972, Ser. No. 287,376
Claims priority, application Switzerland, Sept. 16, 1971, 13,603/71
Int. Cl. C08f 11/04
U.S. Cl. 260—46.5 G
4 Claims

ABSTRACT OF THE DISCLOSURE

New polyepoxide-polysiloxanes are obtained if linear or branched polysiloxanes which contain not more than 4 reactive H atoms and/or alkoxy groups per molecule are esterified or trans-esterified, according to processes which are in themselves known, with cycloaliphatic epoxide-alcohols which contain at least one epoxide group located on a cycloaliphatic ring or ring system and at least one hydroxyl group in the molecule.

The new cycloaliphatic polyepoxide-polysiloxanes can be cured with conventional epoxide resin curing agents, especially cycloaliphatic polycarboxylic acid anhydrides, to give flexible to rubbery-elastic mouldings which show very low water absorption coupled with excellent dielectric properties and high tracking resistance and arcing resistance.

---

It is known to use cycloaliphatic polyepoxide resins for the manufacture or arcing-resistant and tracking-resistant mouldings, cycloaliphatic or halogenated polycarboxylic acid anhydrides being appropriately employed as epoxide resin curing agents. The mouldings obtained in this manner additionally possess good heat resistance and good mechanical and dielectric properties in the hard-elastic range. For example, cycloaliphatic polyepoxides of the following structure

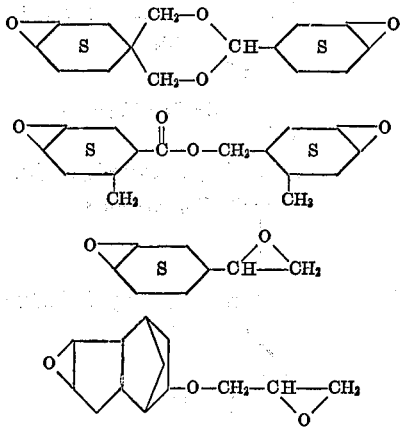

have proved particularly suitable. In comparison to the epoxide resins of the conventional type, manufactured from bisphenol A and epichlorohydrin, the use of the cycloaliphatic epoxide resins results in relatively brittle mouldings of high density of crosslinking, with a relatively high modulus of elasticity and a low elongation at break of only about 1–2 percent.

For numerous uses in practice it is therefore desirable to plasticise the cycloaliphatic epoxide resins. Numerous attempts relating to this problem are known from the literature. It has been found to be a great disadvantage that with increasing plasticisation of the cycloaliphatic epoxide resins the water absorption of the mouldings increases; the water absorption is already of the order of magnitude of 0.5–1% in the case of the unmodified cycloaliphatic epoxide resins cured with hexahydrophthalic anhydride, whilst, by way of comparison, in the case of epoxide resins based on bisphenol A and epichlorohydrin, using the same curing agent, a water absorption which does not exceed a value of 0.4% is measured.

If now, for example, 30 parts of polypropylene glycol of molecular weight 1,025 are added as a plasticiser to 3-(3',4'-epoxycyclohexyl)-9,10 - epoxy - 2,4-dioxaspiro [5.5]undecane, the modulus of elasticity of the cured moulding declines from approx. 50,000 to 30–35,000 kg./cm.$^2$, but the water absorption rises to a value of 0.7–1.0 percent, and this value makes various applications questionable. A further addition of plasticizer is therefore not possible for uses in which good dielectric properties after storage in water or storage in moisture are demanded.

The possibility of manufacturing flexible mouldings based on cycloaliphatic epoxides by introducing more flexible linking members between two ring epoxide end groups has also not resulted in any significant improvement. If, for example, the cycloaliphatic diepoxide of the formula

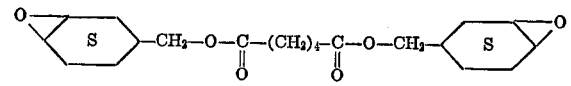

is cured using hexahydrophthalic anhydride, mouldings are obtained which have a modulus of elasticity of approx. 40,000 kg./cm.$^2$, an elongation at break of 2.5 percent and a water absorption of at least 0.6–0.8 percent. It is desired to manufacture flexible mouldings of which the water absorption still remains below a maximum value of 0.5 percent which is desired for electrical applications, the approaches briefly described above do not yield a useful result.

It has now been found that reaction of certain polysiloxane compounds with cycloaliphatic epoxide-alcohols yields new cycloaliphatic polyepoxide compounds which, surprisingly, do not display the abovementioned disadvantages or only display them to a greatly reduced extent. The cycloaliphatic polyepoxides according to the invention can be cured with conventional epoxide resin curing agents, especially cycloaliphatic polycarboxylic acid anhydrides, to give flexible to rubbery-elastic mouldings which display a very low water absorption coupled with excellent dielectric properties and high tracking resistance and arcing resistance. The high elongation at break of these mouldings remains preserved over a wide temperature range.

The subjects of the invention are new polyepoxide-polysiloxane compounds of the formula

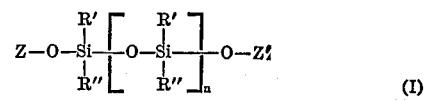

(I)

wherein Z and Z' each denote a radical, obtained by removing the hydroxyl group, of a cycloaliphatic epoxide-alcohol which possesses at least one epoxide group located on a cycloaliphatic ring or ring system and at least one hydroxyl group, $n$ denotes at least 1 and R' and R" independently of one another denote an alkyl, alkenyl, aralkyl, aryl, cycloalkyl, alkoxy or aroxy group, the —O—Z radical or the

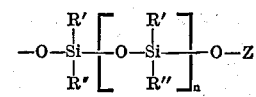

radical.

The polyepoxide-polysiloxanes according to the invention are manufactured by esterifying or trans-esterifying, according to processes which are in themselves known, linear or branched polysiloxanes of the formula

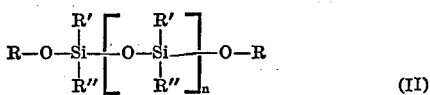

wherein R denotes a hydrogen atom or a lower alkyl radical with 1–4 C atoms and R', R'' and $n$ have the same meaning as in the Formula I, with cycloaliphatic epoxide-alcohols which possess at least one epoxide group located on a cycloaliphatic ring or ring system and at least one hydroxyl group in the molecule.

Preferably, those polysiloxanes are used which do not contain more than 4 reactive hydrogen atoms and/or alkoxy groups per molecule, and wherein, in the Formula II, $n$ or the sum of $n$ denotes a number from 2 to 15, preferably 6 to 15, corresponding to a molecular weight of about 200 to about 2000 or about 750 to about 2000, respectively.

The reaction of the alkoxypolysiloxanes or hydroxypolysiloxanes with the epoxy-alcohols takes place in accordance with known processes, by trans-esterification or esterification. The two components are mixed hot, in approximately stoichiometric amounts, and are reacted, preferably in the presence of a catalyst. The amount of alcohol or water liberated during the trans-esterification is distilled off. Basic, acid and neutral catalysts can be used in the reaction. As examples there may be mentioned: quaternary ammonium salts, titanium salts of organic acids, and aluminium halides and boron halides. The reaction is carried out at temperatures of 50–200° C., but preferably between 80 and 150° C.

The following compounds may be mentioned as examples of the polysiloxanes to be used:

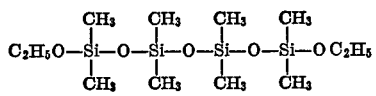

(=diethoxyoctamethyltetrasiloxane)

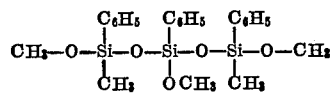

(=dimethyltriphenyltrimethoxytrisiloxane, which is commercially available under the tradename "Sylkyd 50").

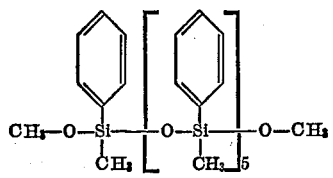

(=dimethoxyhexamethylhexaphenylhexasiloxane).

It is also possible to use commercially obtainable technical mixtures of polysiloxanes which contain at least 2 reactive alkoxy groups and/or hydroxyl groups per molecule and correspond to the abovementioned General Formula II. It is also possible to use mixtures of straight-chain and branched-chain polysiloxanes. The average molecular weight of this mixture should again be in the range of 200 to 2000, preferably 750 to 2000, and the proportion of reactive hydroxyl or alkoxy groups per average molecule should not exceed an amount of 15 or 20 percent by weight.

As cycloaliphatic epoxide-alcohols which are reacted with the polysiloxanes there are to be understood those which contain at least one ring-epoxidised group. The epoxidised rings can consist of a cyclopentyl, cyclohexyl, dicycloheptyl, tricyclodecyl or 2,4-dioxa-spiro-(5,5)-9,10-epoxyundecyl group or generally of epoxidised rings which are built up of saturated hydrocarbon radicals. In addition to the 1,2-epoxide group, these cycloaliphatic ring compounds preferably contain the linking member R, to which at least one primary or secondary hydroxyl group is bonded.

The cycloaliphatic epoxide-alcohols correspond to the following general formulae:

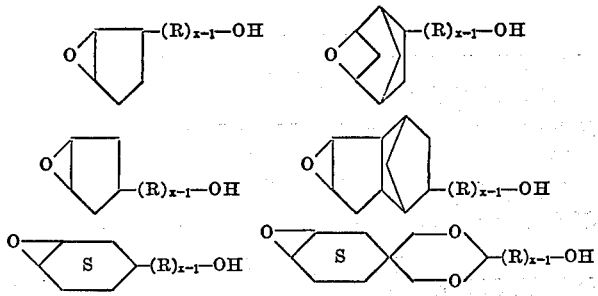

wherein $x$ denotes 1 or 2 and R denotes an unsubstituted or substituted alkylene radical, an alkylene radical interrupted by oxygen atoms or ester groups, preferably an alkylene radical with 1–10 C atoms, or a radical of the formula $$-C\overset{\displaystyle O-CH_2}{\underset{\displaystyle O-CH-(CH_2)_y-}{H}}$$

wherein Y represents a number from 1 to 4.

The following compounds may be mentioned as examples:

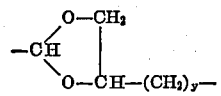

2,3-epoxycyclopentanol

3,4-epoxycyclohexylmethanol

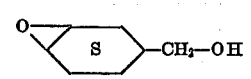

3,4-epoxy-6-methylcyclohexylmethanol

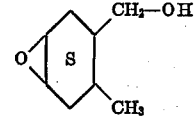

2-(3',4'-epoxycyclohexyl)-4-hydroxymethyl-1,3-dioxolane

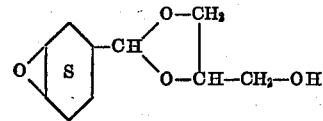

2,3-epoxycyclopentyl-β-hydroxyethyl-ether

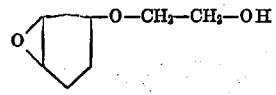

3-oxatricyclo-(3.2.1.0.$^{2,4}$)-octane-6-methanol

2,4-dioxa-spiro-(5.5)-10-epoxyundecyl-3-ethanol

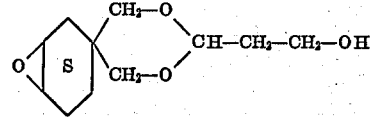

1-hydroxytricyclodecenyl-8,9-epoxide

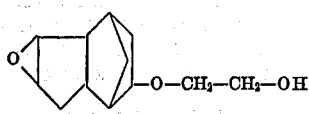

4-oxatetracyclo-(6.2.1.0²·⁷.0³·⁵)-undecane-9-β-hydroxy-ethyl-ether

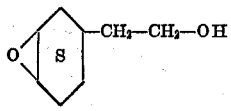

3,4-epoxycyclohexylethanol

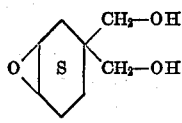

3,4-epoxycyclohexyl-1,1-dimethanol

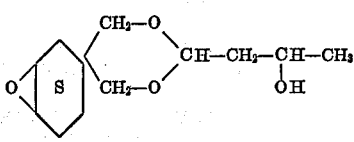

2,4-dioxa-spiro-(5,5)-10-epoxy-undecyl-3-isopropanol

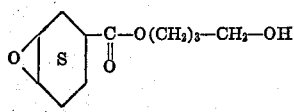

3,4-epoxycyclohexylcarboxylic acid (4-hydroxy)-butyl ester

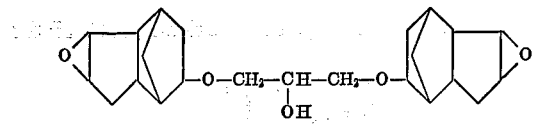

The cycloaliphatic polyepoxides according to the invention, which contain a polysiloxane radical as a flexible linking chain, are liquid to solid depending on the choice of the starting substances. They can now be reacted, with addition of equivalent amounts of a suitable epoxide resin curing agent and, optionally, a curing accelerator, to give flexible mouldings.

As such curing agents, basic or acid compounds can be used.

As examples of suitable curing agents there may be mentioned: amines or amides, such as aliphatic, cycloaliphatic or aromatic, primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethyl-propylenediamine-1,3,N,N-diethyl-propylenediamine-1,3, bis-(4-amino-3-methylcyclohexyl)-methane, 3,5,5 - trimethyl - 3-(aminomethyl)-cyclohexyl-amine ("isophoronediamine"), and Mannich bases, such as 2,4,6 - tris(dimethylaminomethyl)-phenol; m-phenylenediamine, p-phenylenediamine, bis-(4 - aminophenyl)-methane, bis-(4-amino-phenyl)-sulphone, and m-xylylenediamine; N-(2-aminoethyl)-piperazine; adducts of acrylonitrile or monoepoxides, such as ethylene oxide or propylene oxide to polyalkylenepolyamines, such as diethylenetriamine or triethylenetetramine; adducts of polyamines, such as diethylenetriamine or triethylenetetramine in excess, and polyepoxides, such as diomethane-polyglycidylethers; ketimines, for example from acetone or methyl ethyl ketone and bis(p-aminophenyl)-methane; adducts of monophenols or polyphenols and polyamines; polyamides, especially those from aliphatic polyamines, such as diethylenetriamine or triethylenetetramine and dimerised or trimerised unsaturated fatty acids, such as dimerised linseed oil fatty acid ("Versamid"); polymeric polysulphides ("Thiokol"); dicyandiamide and aniline-formaldehyde resins; polyhydric phenols, for example resorcinol, 2,2-bis-(4 - hydroxyphenyl)-propane or phenol-formaldehyde resins; boron trifluoride and boron trichloride as well as their complexes with organic compounds, such as BF₃-ether complexes and BF₃-amine complexes, for example BF₃-monoethylamine complex; acetoacetanilide-BF₂ complex; phosphoric acid; triphenylphosphite; polybasic carboxylic acids and their anhydrides, for example phthalic anhydride, Δ⁴-tetrahydrophthalic anhydride, hexahydrophthalic anhydride, 4-methylhexahydrophthalic anhydride, 3,6-endomethylene-Δ⁴-tetrahydrophthalic anhydride, methyl - 3,6 - endomethylene-Δ⁴-tetrahydrophthalic anhydride (=methylnadic anhydride), 3,4,5,6,7,7 - hexachloro-3,6-endomethylene-Δ⁴-tetrahydrophthalic anhydride, succinic anhydride, adipic anhydride, azelaic anhydride, sebacic anhydride, maleic anhydride, dodecenyl-succinic anhydride; pyromellitic dianhydride, trimellitic anhydride or mixtures of such anhydrides.

Furthermore, curing accelerators can be employed in the curing reaction; when using polyamides, dicyandiamide, polymeric polysulphides or polycarboxylic anhydrides as the curing agents, suitable accelerators are, for example, tertiary amines, their salts or quaternary ammonium compounds, for example 2,4,6 - tris-(dimethylaminomethyl)-phenol, benzyldimethylamine, 2 - ethyl-4-methyl-imidazole, 4 - amino-pyridine and triamylammonium phenolate; also alkali metal alcoholates, such as, for example, sodium hexanetriolate. In curing with amines, examples of accelerators which can be used are monophenols or polyphenols, such as phenol or diomethane, salicylic acid or thiocyanates.

The term "curing" as used here denotes the conversion of the above polyepoxides into insoluble and infusible crosslinked products, and in particular as a rule with simultaneous shaping to give mouldings, such as castings, pressings or laminates and the like, or to give "sheet-like structures" such as coatings, coverings, lacquer films or adhesive bonds.

The flexibility of these mouldings can also be modified as desired by mixing the diepoxide- or polyepoxide-polysiloxane compound with other diepoxide and polyepoxide compounds. Here again, in order to obtain mouldings which are tracking-resistant and are of high electrical quality, cycloaliphatic diepoxide and/or polyepoxide compounds which contain ring-epoxidised groups are employed.

Depending on the choice of the curing agent, the curing can be carried out at room temperature (18–25° C.) or at elevated temperature (for example 50–180° C.).

The curing can, if desired, also be carried out in 2 stages by first prematurely stopping the curing reaction or carrying out the first stage at only moderately elevated temperature, whereby a curable precondensate which is still fusible and soluble (a so-called "B-stage") is obtained from the epoxide component and the curing agent component. Such a precondensate can be used, for example, for the manufacture of "prepregs," compression moulding compositions or sintering powders.

A further subject of the present invention are therefore curable mixtures which are suitable for the manufacture of mouldings, including sheet-like structures and which contain the polyepoxide-polysiloxane compounds according to the invention, optionally together with other polyepoxide compounds, and also curing agents for epoxide resins, such as polyamines or polycarboxylic acid anhydrides.

The polyepoxides according to the invention or their mixtures with other polyepoxide compounds and/or curing agents can furthermore be mixed, in any stage before curing, with customary modifiers such as extenders, fillers and reinforcing agents, pigments, dyestuffs, organic solvents, plasticisers, flow control agents, agents for conferring thixotropy, flameproofing substances or mould release agents.

As examples of extenders, reinforcing agents, fillers and pigments which can be employed in the curable mixtures according to the invention there may be mentioned: coal tar, bitumen, glass fibres, boron fibres, carbon fibres, asbestos fibres, natural and synthetic textile fibers, such as polyester fibres, polyamide fibres and polyacrylonitrile fibres; polyethylene powders and polypropylene powders; quartz powder; mineral silicates, such as mica, asbestos powder and slate powder; kaolin, aluminium oxide trihydrate, chalk powder, gypsum, antimony trioxide, bentones, silica aerogel ("Aerosil"), and lithopone; baryte, titanium dioxide, carbon black, graphite, oxide pigments, such as iron oxide, or metal powders, such as aluminium powder or iron powder.

Examples of suitable organic solvents for modifying the curable mixtures are toluene, xylene, n-propanol, butyl acetate, acetone, methyl ethyl ketone, diacetone-alcohol, ethylene glycol, monomethyl ether, monoethyl ether and monobutyl ether.

As plasticisers for modifying the curable mixtures it is possible to use, for example, dibutyl, dioctyl and dinonyl phthalate, tricresyl phosphate, trixylenyl phosphate and also polypropylene glycols.

As flow control agents when employing the curable mixtures, especially in surface protection, it is possible to add, for example, silicones, cellulose acetobutyrate, polyvinyl butyral, waxes, stearates and the like (which in part are also used as mould release agents).

Particularly for use in the lacquer field, the polyepoxide compounds according to the invention can furthermore be partially esterified in a known manner with carboxylic acids such as, in particular, higher unsaturated fatty acids. It is furthermore possible to add other curable synthetic resins, for example phenolplasts or aminoplasts, to such lacquer resin formulations.

The curable mixtures according to the invention can be manufactured in the usual manner with the aid of known mixing equipment (stirrers, kneaders, mills and the like).

The curable polyepoxide resin mixtures according to the invention are above all employed in the fields of surface protection, the electrical industry, especially for the manufacture of coating compositions for electrical insulations capable of withstanding external weathering, laminating processes and the building industry. They can be used, in a formulation suited in each case to the particular end use, in the unfilled or filled state, optionally in the form of solutions or emulsions, as paints, lacquers, compression moulding compositions, sintering powders, dipping resins, casting resins, injection moulding formulations, impregnating resins and binders, adhesives, tool resins, laminating resins, sealing and filling compositions, floor covering compositions and binders for mineral aggregates.

In the examples which follow, unless otherwise stated, parts denote parts by weight and percentages denote percentages by weight. The relationship of parts by volume to parts by weight is as of the millilitre to the gram.

For determining the mechanical and electrical properties of the curable mixtures described in the examples which follow, plaques of size 92 x 41 x 12 mm. were manufactured for determining the flexural strength, deflection, impact strength and water absorption.

The test specimens (60 x 10 x 4 mm.) for determining the water absorption and for the flexural test and impact test (VSM [1] 77,103 and VSM [1] 77,105, respectively) were machined from the plaques. For determining the Martens heat distortion point (DIN [2] 53,458) test specimens of dimensions 120 x 15 x 10 mm. were cast in each case.

EXAMPLE 1

100 parts of 3,4-epoxycyclohexylmethanol are mixed with 150 parts of a methylphenylpolysiloxane of average molecular weight 750 which contains 15 percent by weight of reactive methoxy groups and is commercially available under the name "Z-6188" from Messrs. Dow Corning Corp. This mixture is reacted, with addition of 0.1 part of tetramethylammonium chloride as the catalyst, for 4 hours at 140° C. whilst stirring, simultaneously distilling off methanol and passing nitrogen over the mixture. Thereafter the reaction mixture is kept for approx. 30 minutes under a vacuum of 20 mm. Hg at 90° C.

A colourless liquid of medium viscosity, having an epoxide equivalent of 3.1 equivalents/kg. (theory: 3.05 equivalents/kg.) is obtained in quantitative yield. The analysis of a control sample in the IR-spectrum shows that a quantitative trans-esterification between the methoxy groups and the hydroxyl groups has taken place.

EXAMPLE 2

100 parts of 3,4-epoxycyclohexylmethanol are mixed with 200 parts of a methylphenylpolysiloxane of average molecular weight 1,200 which contains 11 percent by weight of reactive methoxy groups and is commercially available under the name "Rhodorsil-Resine 6349" from Messrs. Rhone-Poulenc.

This mixture is reacted, with addition of 0.1 part of tetramethylammonium chloride as the catalyst, for 4 hours at 140° C. whilst stirring, simultaneously distilling off methanol and passing nitrogen over the mixture. Thereafter the reaction mixture is additionally kept under a vacuum of 20 mm. Hg at 90° C. for approx. 30 minutes.

A colourless liquid of medium viscosity, having an epoxide content of 2.36 equivalents/kg. (theory: 2.87) is obtained in quantitative yield.

EXAMPLE 3

100 parts of a cycloaliphatic epoxide-alcohol of the formula

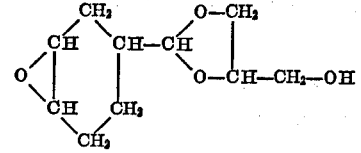

[2-(3',4'-epoxycyclohexyl) - 4 - hydroxymethyl - 1,3 - dioxolane] are mixed with 100 parts of a methylphenylpolysiloxane of average molecular weight 750 which contains 15 percent by weight of reactive methoxy groups and is commercially available under the name "Z-6188" from Messrs. Dow-Corning Corp. The reaction is carried out analogously to Example 1, with addition of 0.1 part of tetramethylammonium chloride as the catalyst.

A colourless liquid of medium viscosity, having an epoxide content of 2.45 equivalents/kg. (theory: 2.70) is obtained in quantitative yield.

EXAMPLES OF APPLICATIONS

Example I 100 parts of the polyepoxymethylphenylpolysiloxane manufactured according to Example 1, having an epoxide content of 3.1 equivalents/kg., are mixed with 50 parts ---
[1] VSM=Verein Schweizerischer Maschinenindustrieller.
[2] DIN=Deutsche Industrie-Norm.

of hexahydrophthalic anhydride and 3 parts of a solution of 0.82 part of sodium metal in 100 parts of 2,4-dihydroxy-3-hydroxymethylpentane at 80° C. and the mixture is poured into aluminium moulds warmed to the same temperature. Curing is carried out for 4 hours at 80° C. and subsequently for 16 hours at 120° C. Castings having the following properties were obtained:

Flexural strength (VSM [1] 77,103), kg./mm.[2] --- 10–12
Deflection (VSM 77,103), mm.[2] ------------- 6–8
Impact strength (VSM 77,105), cm. kg./cm.[2] -- 12
Water absorption after 4 days at 20° C. (DIN [2] 53,472), percent ------------------------- 0.1–0.2
Dielectric loss factor tg δ (50 Hz.) at
 20° C.: --------------------------------- 0.004
 40° C.: --------------------------------- 0.0004
 80° C.: --------------------------------- 0.010
 100° C.: -------------------------------- 0.015
Tensile strength (VSM 77,101), kg./mm.[2] ------ 4–5
Elongation at break (VSM 77,101), percent ---- 2.5

[1] VSM-Verein Schweizerischer Maschinenindustrieller.
[2] DIN-Deutsche Industrie Norm.

Example II 100 parts of the polyepoxymethylphenylpolysiloxane manufactured according to Example 2, having an epoxide content of 2.36 equivalents/kg., are mixed with 35 parts of hexahydrophthalic anhydride and 3 parts of a solution of 0.82 part of sodium metal in 100 parts of 2,4-dihydroxy-3-hydroxy-methylpentane at 80° C. and the mixture is poured into aluminium moulds warmed to the same temperature. Curing is carried out for 4 hours at 80° C. and the next 16 hours at 120° C. Castings having the following properties were obtained:

Flexural strength (VSM 77,103), kg./mm.[2] ---- 2–4
Deflection (VSM 77,103), mm. ---------------- 2–4
Impact strength (VSM 77,105), cm. kg./cm.[2] -- 3–6
Martens value (DIN 53,458), °C. ------------- 55–65
Water absorption after 4 days at 20° C. (DIN 53,472), percent ------------------------- 0.2–0.3

Example III 100 parts of the polyepoxymethylphenylpolysiloxane manufactured according to Example 3, having an epoxide content of 2.45 equivalents/kg., are mixed with 35 parts of hexahydrophthalic anhydride and 3 parts of a solution of 0.82 part of sodium metal in 100 parts of 2,4-dihydroxy-3-hydroxy-methylpentane at 80° C. and poured into aluminium moulds warmed to the same temperature. Curing takes place over the course of 4 hours at 80° C. followed by 16 hours at 120° C. Castings having the following properties were obtained:

Flexural strength (VSM 77,103), kg./mm.[2] -- 6–10
Deflection (VSM 77,103), mm. ---------------- 4–6
Impact strength (VSM 77,105), cm. kg./cm.[2] _ 4–8
Martens value (DIN 53,458), °C. ------------- 75–85
Water absorption after 4 days at 20° C. (DIN 53,472), percent ------------------------- 0.15–0.25

Comparison Example A 70 parts of a cycloaliphatic diepoxide compound of the formula

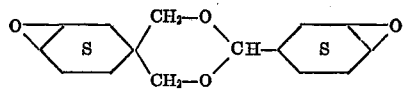

are mixed with 30 parts of polypropylene glycol of average molecular weight 1,025 at room temperature and then warmed to 80° C., 70 parts of hexahydrophthalic anhydride and 6 parts of a solution of 0.82 part of sodium metal in 100 parts of 2,4-dihydroxy-3-hydroxymethyl-pentane are added and the whole is well mixed.

The mixture is poured into aluminium moulds warmed to the same temperature. Curing takes place over the course of 4 hours at 80° C. followed by 16 hours at 120° C. Castings having the following properties were obtained:

Flexural strength (VSM 77,103), kg./mm.[2] ---- 8–10
Deflection (VSM 77,103), mm. ---------------- 5–7
Impact strength (VSM 77,105), cm. kg./cm.[2] -- 8–10
Water absorption after 4 days at 20° C. (DIN 53,472), percent ------------------------- 0.5–0.7
Dielectric loss factor tg δ (50 Hz.) at:
 20° C.: --------------------------------- 0.01
 40° C.: --------------------------------- 0.01
 80° C.: --------------------------------- 0.01
 100° C.: -------------------------------- 0.065
 130° C.: -------------------------------- >0.10
Tensile strength (VSM 77,101), kg./mm.[2] ----- 4–5
Elongation at break (VSM 77,101), percent --- 1.5

Comparison Example B 65 parts of hexahydrophthalic anhydride and 12 parts of a solution of 0.82 part of sodium metal in 100 parts of 2,4-dihydroxy-3-hydroxymethylpentane are added to 100 parts of a cycloaliphatic diepoxide compound of the formula

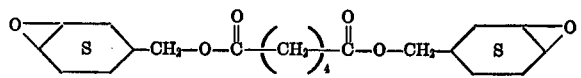

at 80° C. and the whole is well mixed.

The mixture is poured into aluminium moulds warmed to the same temperature. Curing takes place over the course of 4 hours at 80° C. followed by 16 hours at 120° C. A casting having the following properties was obtained:

Flexural strength (VSM 77,103), kg./mm.[2] ---- 10–12
Deflection (VSM 77,103), mm.[2] -------------- 10–15
Impact strength (VSM 77,105), cm. kg./cm.[2] -- 15
Water absorption after 4 days at 20° C. (DIN 53,472), percent ------------------------- 0.6–0.8
Dielectric loss factor tg δ (50 Hz.) at:
 20° C.: --------------------------------- 0.004
 100° C.: -------------------------------- 0.05
 110° C.: -------------------------------- 0.10
Tensile strength (VSM 77,101), kg./mm.[2] ----- 6–7
Elongation at break (VSM 77,101), percent ---- 2–2.5

We claim:
1. A polyepoxide-polysilicone having the formula:

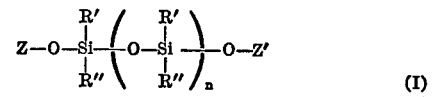

(I)

wherein n is at least one Z and Z' each denote a radical obtained by removing the hydroxyl group of a cycloaliphatic epoxide-alcohol having the formula:

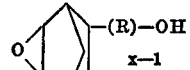
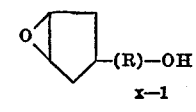
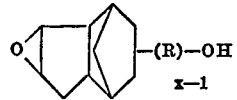

wherein x is 1 or 2, R is substituted or unsubstituted alkylene containing from 1 to 10 carbon atoms, alkylene interrupted by oxygen atoms, or ester groups, or a group having the formula:

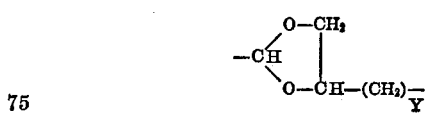

wherein
Y is an integer from 1 to 4;
R' and R" independently is an alkyl, alkenyl, aralkyl, aryl, cycloalkyl, alkoxy, aroxy, the —O—Z radical or a group having the formula:

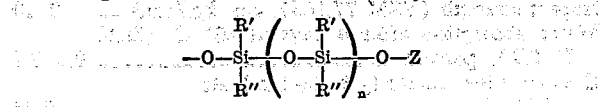

2. A polyepoxide-polysilicone according to claim 1 containing from 2 to 4 of said cycloaliphatic epoxy groups per molecule; and $n$ is an integer of from 2 to 15.

3. A polyepoxide-polysilicone according to claim 2 wherein $n$ is an integer of from 6 to 15.

4. A curable composition containing (a) a polyepoxide-polysilicone according to claim 1 and (b) a basic or acid curing agent.

References Cited

UNITED STATES PATENTS

| | | | |
|---|---|---|---|
| 3,324,080 | 6/1967 | Hicks | 260—46.5 Y |
| 2,819,245 | 1/1958 | Shorr | 260—46.5 Y |

DONALD E. CZAJA, Primary Examiner

M. I. MARQUIS, Assistant Examiner

U.S. Cl. X.R.

117—161 ZA; 260—13, 18 S, 30.6 SB, 32.8 SB, 33.2 SB, 33.4 SB, 33.6 SB, 37 SB, 46.5 Y, 348 SC, 448.2 B, 824, 827